US008563111B2

(12) United States Patent
Linford et al.

(10) Patent No.: US 8,563,111 B2
(45) Date of Patent: Oct. 22, 2013

(54) DIGITAL INFORMATION MEDIA HAVING ADHESION PROMOTION LAYER ON A SUBSTRATE

(75) Inventors: Matthew R. Linford, Orem, UT (US); Christopher M. Miller, Pleasant Grove, UT (US)

(73) Assignee: Brigham Young University, Provo, UT (US)

( * ) Notice: Subject to any disclaimer, the term of this patent is extended or adjusted under 35 U.S.C. 154(b) by 136 days.

(21) Appl. No.: 12/980,784

(22) Filed: Dec. 29, 2010

(65) Prior Publication Data

US 2011/0158076 A1 Jun. 30, 2011

Related U.S. Application Data

(60) Provisional application No. 61/291,215, filed on Dec. 30, 2009.

(51) Int. Cl.
*G11B 7/24* (2006.01)

(52) U.S. Cl.
USPC .................... 428/64.1; 428/64.4; 430/270.11

(58) Field of Classification Search
USPC ........................... 428/64.1, 64.4; 430/270.11
See application file for complete search history.

(56) References Cited

U.S. PATENT DOCUMENTS

| | | | | |
|---|---|---|---|---|
| 5,748,607 | A | 5/1998 | Ohira et al. | |
| 6,599,602 | B2 * | 7/2003 | Bennett et al. | 428/64.1 |
| 2005/0153094 | A1 | 7/2005 | Tabata et al. | |

FOREIGN PATENT DOCUMENTS

| | | |
|---|---|---|
| JP | 11-250503 | 9/1999 |
| JP | 2003-173570 | 6/2003 |

OTHER PUBLICATIONS

PCT/US2010/062334 International Search Report dated Sep. 30, 2011 (3 pages).

* cited by examiner

*Primary Examiner* — Elizabeth Mulvaney
(74) *Attorney, Agent, or Firm* — Workman Nydegger

(57) ABSTRACT

Disclosed is a digital information media having an adhesion promotion layer supported on a dummy (L1) substrate that enables secure bonding of the L1 layer, directly or indirectly, to the rest of the stack of layers in the digital information media. Certain materials including metals, metal alloys, or metalloids enhance adhesion between the adhesive layer and the L1. By applying an adhesion promotion layer of such materials on an inner surface of the L1, the bond between the adhesive and the adhesion promotion layer improves bonding and reduces a tendency for the L1 to delaminate from the rest of the stack. The tendency for breakage of the media at the juncture between the adhesion promotion layer and the adhesive is reduced, and incursion of moisture or oxygen through the interface between the adhesion promotion layer and the adhesive is inhibited.

20 Claims, 4 Drawing Sheets

65
Provide Dummy Substrate 70
Metalize with Metal, Alloy, or Metalloid 75
Provide Base Substrate 80
85 Stamp Base Substrate
Provide Base Substrate 95
90 Metalize Base Substrate
Apply Data Layer(s) 100
Bond Metalized Dummy Substrate to Base Substrate by Adhesive 105

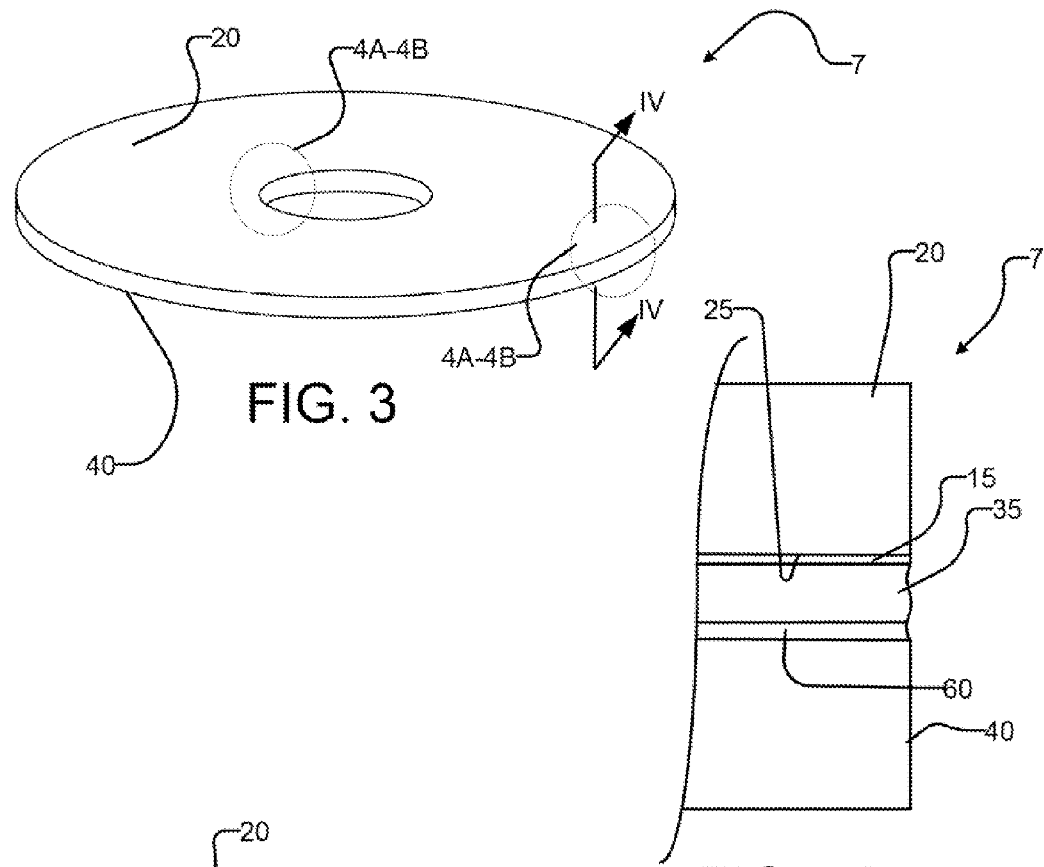
FIG. 3
FIG. 4A
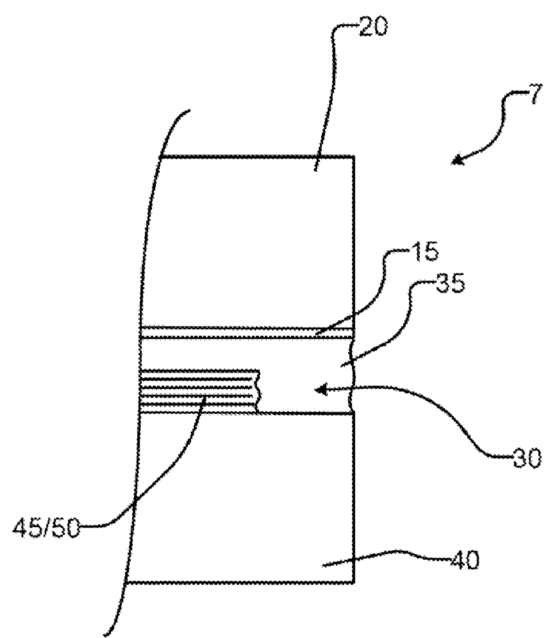
FIG. 4B
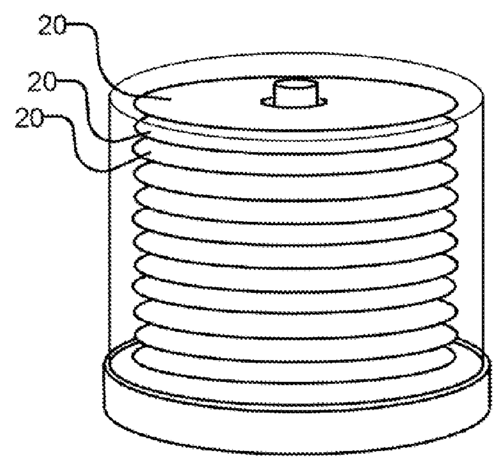
FIG. 5

DIGITAL INFORMATION MEDIA HAVING ADHESION PROMOTION LAYER ON A SUBSTRATE

CROSS-REFERENCE TO RELATED APPLICATIONS

This application claims benefit of priority to U.S. Provisional Patent Application No. 61/291,215 filed on Dec. 30, 2009 entitled "DIGITAL INFORMATION MEDIA HAVING ADHESION PROMOTION LAYER ON L1," the entire contents of which are hereby incorporated by reference.

TECHNICAL FIELD

Embodiments of the invention relate generally to digital information media, and more particularly to digital information media having an adhesion promotion layer on the dummy substrate.

DESCRIPTION OF RELATED ART

Optical storage media such as compact discs (CDs), digital video discs (DVDs) and Blu-ray discs are made of a complex layered series of materials. Failure in or between any of the layers can result in loss of data, and ultimately can render the disc inoperable. The lifetime of current commercial discs is significantly shorter than most consumers recognize. Large institutions are more likely to be aware of the shortcomings of conventional discs, and must engage in costly and time consuming copying of data onto fresh media in order to avoid loss of data. The data must be copied periodically before the life of the media lapses.

Optical information disc failure can result from a variety of causes. One of the reasons that these discs fail is due to migration of oxygen and moisture through outer edges between layers of the discs. (See U.S. Patent Application Publication No. 2008/0213628, filed Mar. 1, 2007, and published Sep. 4, 2008 to Hailu et al. for an example of oxidation entering through the edges of the disc). Heat and cold can accelerate such degradation. Physical stress from bending, cracking, or breaking of the disc during normal use or accidental mistreatment can permanently damage the disc, preventing reading of data. Any of these types of stresses and a variety of environments can cause degradation and even lead to delamination of the layers themselves. Also, failures are more likely as the discs age, as materials in the disc can oxidize or otherwise degrade over time.

One of the weaker links in the stacks of layers in digital information media has typically been between the dummy substrate (L1) and the rest of the stack. In particular, the bond between the L1 and the adhesive layer is often the location at which the disc breaks when exposed to bending and other forces. Similarly, this junction between the L1 and the adhesive maybe vulnerable to incursion of moisture and/or oxygen.

Adhesion promotion layers have been used to improve bonding between interior layers in digital information media. For example, U.S. Pat. No. 5,912,103 to Ebina et al. shows an adhesion promotion layer 4 between a recording layer 3 and a dielectric protecting layer 5. Adhesion promotion layers conventionally include an organic material, although there are varying degrees of adhesion promotion properties among all materials. For example, some metals are more "sticky" or promote adhesion better than other metals. However, metals are typically employed for other purposes in optical discs, such as for increasing reflectivity.

Metallization or reflective layers of stamped discs may be supported directly on the stamped substrate. U.S. Pat. No. 4,363,844 to Lewis et al. shows a metallization layer on a stamped substrate or other stamped prerecorded surface. This patent also has metallization layers of two prerecorded discs bonded together by an adhesive, as shown in FIG. 3. Column 2, lines 62-64 disclose that intervening polymer layers may be placed between the adhesive and the metallization layers.

Current commercially available optical information media fail or are at least inadequate to deliver secure bonds between the various layers, and in particular between the L1 layer and the rest of the stack of layers. Thus, these conventional media fail to provide the long-term data storage that is needed. These conventional discs have high failure rates and are susceptible to failure due to delamination and/or oxidation when oxygen or moisture migrates into the disc through the edges. These conventional discs delaminate under the stresses and environments to which they are typically exposed. Delamination or breakage often occurs between the L1 and adhesive layer. Delamination is frequently caused by failure of the adhesive layer to remain bonded to the L1 layer in the media. Accordingly, there exists a need for technologies that reduce delamination between the L1 and the adhesive layer in order to improve the lifetime of optical media and the data stored therein.

SUMMARY

Digital information media having an adhesion promotion layer supported on the L1 or dummy substrate that enables secure bonding of the L1 layer to the rest of the stack of layers in the digital information media are disclosed. Certain materials including metals, metal alloys, and metalloids can enhance adhesion between the adhesive layer and the L1. By applying an adhesion promotion layer of such materials on an inner surface of the L1, the bond between the adhesive and the adhesion promotion layer has improved bonding and reduces a tendency for the L1 to delaminate from the rest of the stack. The tendency for breakage or delamination of the media at the juncture between the adhesion promotion layer and the adhesive is reduced, and incursion of moisture or oxygen through the interface between the adhesion promotion layer and the adhesive is inhibited.

The adhesion promotion layers disclosed herein may be applied to any of a variety of digital information media including prerecorded stamped discs, recordable discs, dual sided or multi-data-layered discs, for example. In the case of prerecorded stamped discs, the adhesion promotion layer may be one of at least two metal, metal alloy, or metalloid layers. The adhesion promotion layer is supported directly on the dummy substrate for improved bonding with an adjacent adhesive layer. The other metal, metal alloy, or metalloid layer may be a metallization or reflective layer applied to the stamped base substrate (L0).

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

FIG. 3 shows the digital information disc of FIG. 2 in its assembled state.

FIG. 4A shows a sectional view taken along line IV-IV of FIG. 3 illustrating a stamped disc configuration.

FIG. 4B shows a sectional view taken along line IV-IV of FIG. 3 illustrating a recordable disc configuration.

FIG. 5 shows a stack of metalized or metalloidized dummy substrates in accordance with the embodiments of the invention.

DETAILED DESCRIPTION

Figure 1:
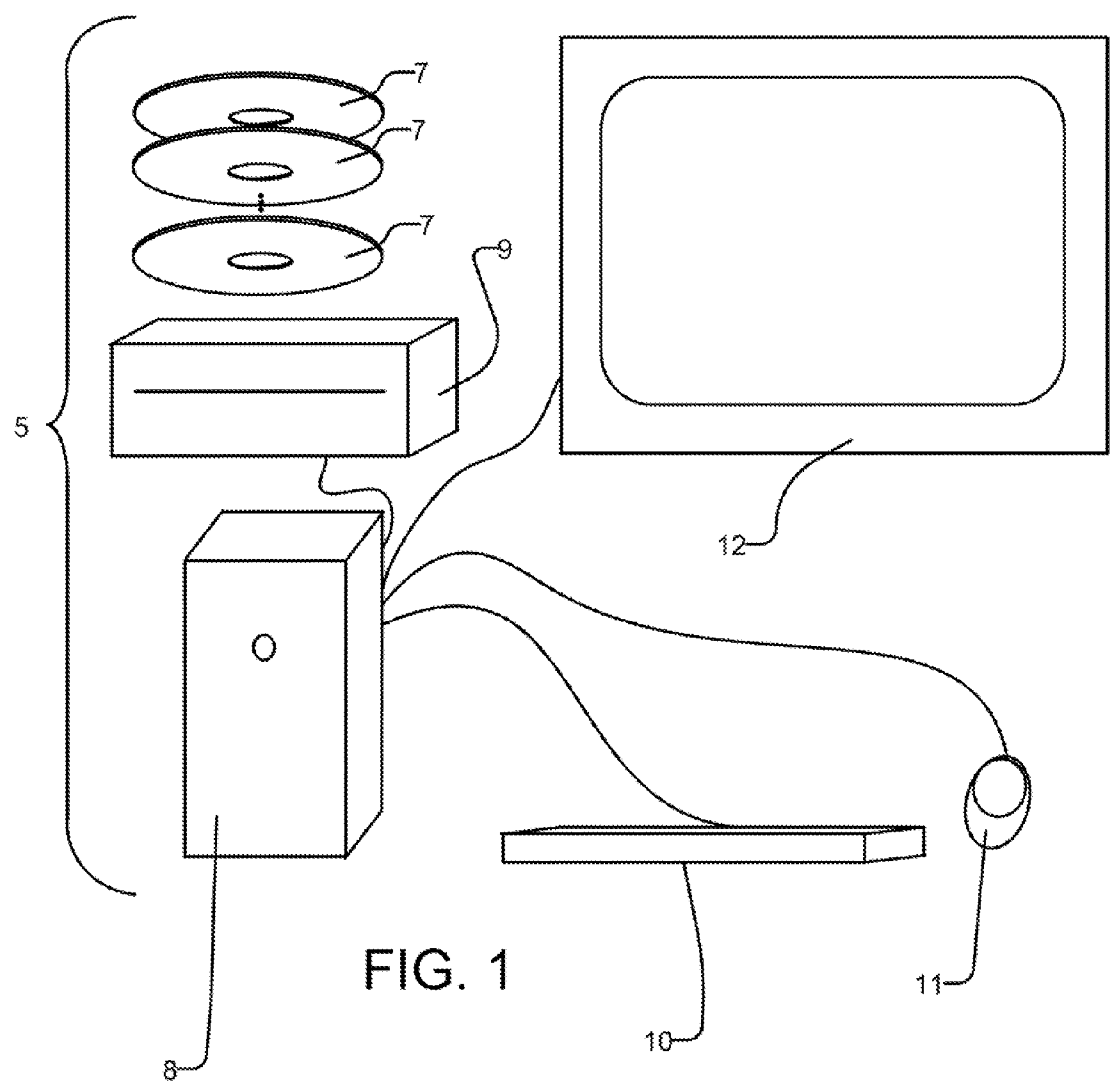
FIG. 1 shows a system for writing to and/or reading from digital information media in accordance with embodiments of the invention.

While compositions and methods are described in terms of "comprising" various components or steps (interpreted as meaning "including, but not limited to"), the compositions and methods can also "consist essentially of or "consist of the various components and steps, such terminology should be interpreted as defining essentially closed-member groups.

As described above, conventional digital information media falls short in providing securely bonded layers that resist delamination and encroachment of moisture and oxygen between the layers. In particular, the junction between the dummy substrate (L1) and the rest of the stack of layers has typically been a weak link that is more vulnerable to delamination resulting in loss of data. Adhesion promotion layers have been implemented as interface layers at internal locations in the stack for improving bonds between the internal layers. These adhesion promotion layers usually comprise some organic material. The dummy substrate is typically bonded to the top of the stack supported on the base substrate by an adhesive. The adhesive typically bonds the dummy substrate to the underlying stack. The bond between the adhesive layer and the dummy substrate is relatively weak. Thus, delamination often occurs when the digital information media is exposed to bending forces, other forces, and/or other adverse environmental conditions. These forces and conditions may be experienced intentionally or unintentionally during normal use. In any case, the life of the media is shortened by wear and tear that tends toward delamination and loss of data.

Therefore, there is a need for an improved strength media, and in particular, there is a need to provide an improved bond between the dummy substrate and the rest of the stack. To this end, the embodiments disclosed below are directed to improved strength media, and to improved bonding between the dummy substrate and the rest of the stack in digital information media.

Materials

Optical information media can generally be any shape and size. A currently preferred shape is a flat, round disc. Other shapes include a drum or a linear tape. Currently envisioned media include flat, round shapes in sizes including about 8 cm diameter, about 12 cm diameter (like a conventional CD or DVD), about 13 cm diameter, about 20 cm diameter, about 10 inch (about 25.4 cm) diameter, about 26 cm diameter, and about 12 inch (about 30.48 cm) diameter. Discs contain an inner radial portion, a middle radial portion, an outer radial portion, and an outer edge. The inner radial portion can optionally contain a hole and an inner edge.

Adhesive layers bond any of the other layers together, and in particular are used to bond the outer second substrate once a stack of layers have been applied to an outer first substrate. Examples of adhesives include polyurethanes, polyurethane acrylates, polyepoxides, polyester acrylates, polyphenolic resins, acrylics, polystyrene spheres, glass rods, or carbon nanotubes. Adhesives can be applied by a variety of methods such as spin coating or spraying. Once applied to other layers in a disc, some adhesives may be cured by applying UV radiation.

One embodiment relates to an optical data medium having at least one substrate layer and other layers. The substrate and/or other layers generally surround and protect at least one data layer. A line passing perpendicularly through the plane formed by the medium would first intersect the substrate, then the data layer, and then one or more other layer(s). The other layer(s) may include one or more intervening layers, an adhesive layer, and/or another substrate. Protective layers that inhibit passage of moisture from outside the disc to the data layer include metal layers, $SiO_2$, and $Si_3N_4$. Moisture barrier materials may be incorporated into the adhesive layer to impart moisture protection for the data layer(s).

The protective layer(s) can directly facially contact the data layer, or there can be one or more first intervening layer(s) between the protective layer and the data layer. In one embodiment, a line extending perpendicularly through the plane of the medium would first intersect the substrate, then the protective layer, then the intervening layer(s), then the data layer, then any additional layer(s) and substrate(s).

The substrate layer(s) may comprise polycarbonate, polystyrene, aluminum oxide, polydimethyl siloxane, polymethylmethacrylate, silicon oxide, glass, fused silica, or mixtures thereof.

The support substrate can generally be any thickness. The substrate thickness can be selected as a function of the drive capacity: 1.2 millimeter-thick substrates are compatible with CD drives, 0.6 millimeter-thick substrates are compatible with DVD drives, and 0.1 millimeter-thick substrates are compatible with BD drives.

In a simple form, digital information media in accordance with embodiments of the invention includes at least one first substrate that is a base substrate, at least one second substrate that is a dummy substrate, and at least one adhesion promotion layer supported on the second substrate. At least one adhesive layer bonds the adhesion promotion layer either directly or indirectly to the first substrate. In some embodiments, the adhesion promotion layer may include at least one of a metal, a metal alloy, and a metalloid. In some embodiments, the adhesion promotion layer may include one or more materials from the group comprising chromium, titanium, nickel, tungsten, silicon, and combinations thereof.

In one embodiment, a metal layer may be supported on the first substrate (L0). The metal layer on the first substrate may include any of a variety of metals, metal alloys, and metalloids to provide reflectivity, to provide other beneficial properties, and/or to promote adhesion to other layers. The metal, metal alloy, or metalloid on the first substrate may include at least one material from the group comprising chromium, titanium, nickel, tungsten, silicon, and combinations thereof. The adhesion promotion layer on the L1 may include a metal, metal alloy, or metalloid. In some embodiments, the adhesion promotion layer may include a material from the group comprising chromium, titanium, nickel, tungsten, silicon, and combinations thereof. In one embodiment, the first substrate comprises a pressed substrate having a pattern of data pits stamped into the first substrate with the metal layer overlaying the pattern of data pits. In another embodiment, at least one data layer is supported on the first substrate. The data layer may include one or more metal, metal alloy, dye, or combinations thereof to form a recordable information media. In this case, the adhesive layer bonds the adhesion promotion layer to the data layer. In a variation of this embodiment, two or more data layers may be supported on the first substrate. In this variation, the adhesive layer bonds the adhesion promotion layer to one of the data layers.

In another simple form, embodiments of the invention include at least one metalized dummy substrate having at least one metallization material supported on a side of the dummy substrate adapted to face inwardly relative to the media. The metallization material provides an adhesion promotion layer on the dummy substrate.

FIG. 1 shows a diagrammatic view illustrating a system 5 for writing to and/or reading from digital information media 7 in accordance with embodiments of the invention. As shown, the system 5 includes a computer 8 and a disc drive 9, which may comprise a reader and/or a writer. The system also has a variety of user interfaces including a keyboard 10, a mouse 11, and a screen 12. Thus, a user may place media 7 in the drive 9 to read from or write to the media. The media 7 may include discs in accordance with embodiments of the invention that are stronger than discs that do not include an adhesion promotion layer and/or other features described herein.

Figure 2:
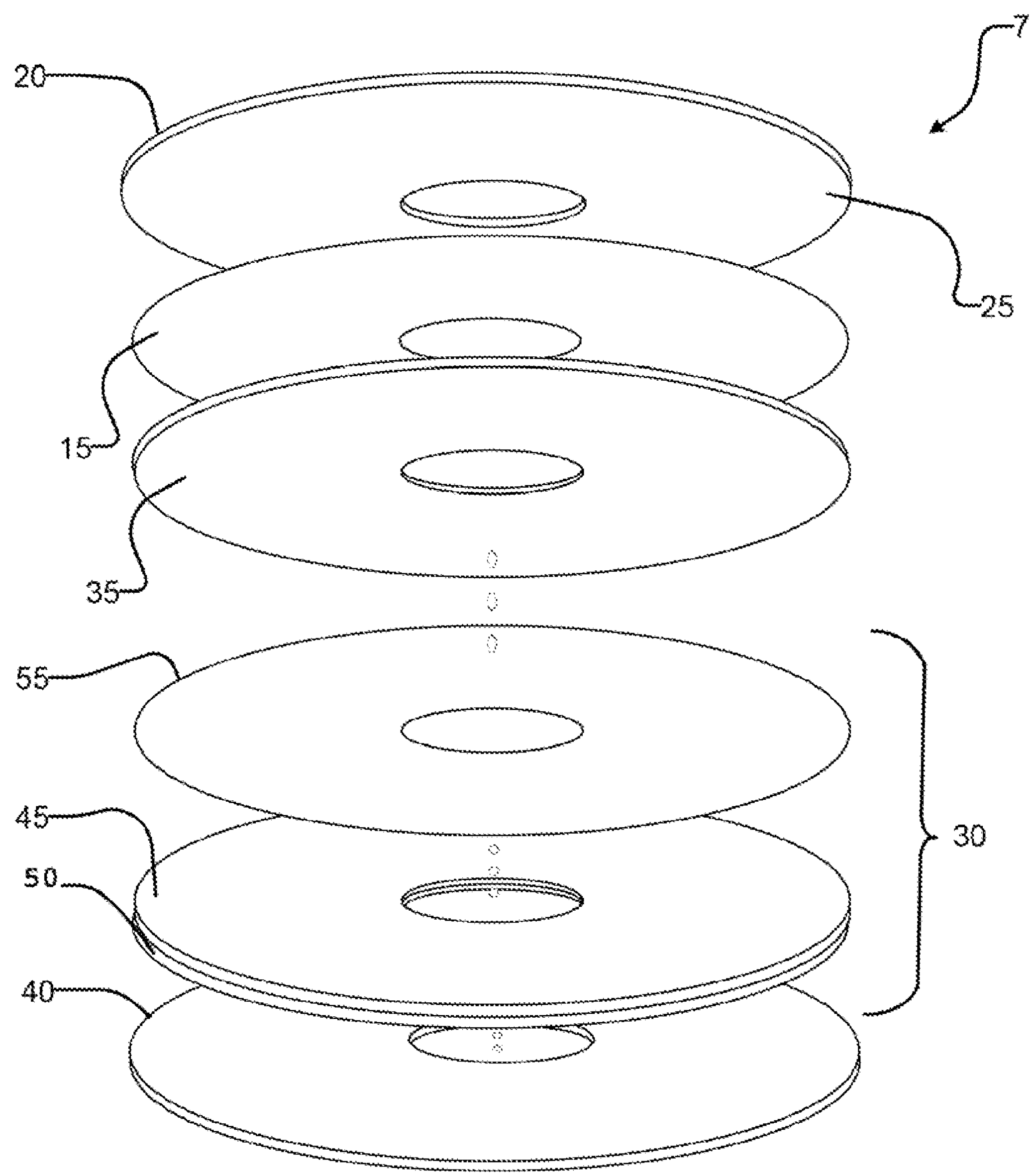
FIG. 2 shows an exploded view of a digital information disc illustrating a variety of layers.

FIG. 2 shows an exploded view of a digital information disc 7 illustrating a variety of layers including the adhesion promotion layer 15 that is supported on an "L1" or dummy substrate 20. The adhesion promotion layer may be applied to a lower surface 25 of the dummy substrate 20 by a sputtering process, some other process, or combination of processes without limitation.

The adhesion promotion layer 15 and substrate 20 may be bonded as a unit by an adhesive layer 35 to any number of layers in a stack of layers 30 supported on an L0 or base substrate 40. The stack of layers 30 may include one or more data layers 45, 50 and other layers represented by layer 55 and ellipses, as shown in FIG. 2. The stack of layers 30 may include zero layers, one layer, or multiple layers without limitation. The stack 30 may include one or more of the data layers 45, 50, dielectric layer(s), absorptive layer(s), insulative layer(s), protective layers), heat management layer(s), dissipative layer(s), and/or reflective layers) without limitation. The base substrate 40 may be a pressed or stamped substrate that includes prerecorded digital information represented by pits formed in the substrate 40 during stamping. Alternatively, the base substrate 40 may be a substrate having a wobble groove or other structure to enabling tracking, and may be adapted for receiving one or more data layers 45, 50 thereon. Any number of the layers may be assembled to form the disc or media 7 shown in FIG. 3 in its assembled state.

FIG. 3 shows the digital information disc 7 of FIG. 2 in its assembled state with the dummy substrate (L1) 20 on top and the base substrate (LO) 40 on the bottom and having a section line IV-IV for indicating an orientation of the views shown in FIGS. 4A and 4B. Also, encircled regions labeled IV-IV indicate portions of the media 7 shown in FIGS. 4A and 4B.

FIG. 4A shows a sectional view taken along line IV-IV of FIG. 3 illustrating a stamped disc configuration. Like the general illustration of FIG. 2, the adhesion promotion layer 15 is supported on the bottom side 25 of the dummy substrate 20. In the configuration shown in FIG. 4A, the L0 or base substrate 40 is a stamped disc having prerecorded information comprising pits and lands stamped or molded into the substrate 40. The stamped disc may include a metal layer 60 applied thereto such as by electroless plating or by sputtering, for example. This metal layer 60 (or metallization) of the substrate 40 provides a protective and/or reflective layer that improves optical contrast in stamped discs. This metallization may also improve adhesion between the base substrate and any layers applied thereto. It is to be understood that this metallization may function as an adhesive promotion layer, depending on the materials used for the data layer(s). For example, a metal layer 60 comprising chromium, titanium, nickel, tungsten, silicon, and combinations thereof may form an excellent adhesion promotion layer for improved bonding between the L0 layer and the adhesive 35. The metalized substrate 40 is also bonded by the adhesive layer 35 to the dummy substrate 20 via the adhesion promotion layer 15.

FIG. 4B shows a sectional view taken along line IV-IV of FIG. 3 illustrating a recordable disc configuration in which one or more data layers 45/50 are applied to the L0 or base substrate 40. Other layers may also be applied above and/or below the data layer(s) 45/50, as indicated at 30. The L0 or base substrate 40 and layers supported thereon are bonded to the L1 20 by the adhesive layer 35 and the adhesive promotion layer 15. It is to be understood that the data layer(s) may function as an adhesive promotion layer, depending on the materials used for the data layer(s). For example, data layers comprising chromium, titanium, nickel, tungsten, silicon, and combinations thereof may form excellent adhesion promotion layers.

The various layers and their relationships to each other may vary. However, in particular embodiments, the media 7 may include from bottom to top an L0 base substrate 40, a metallization/metal layer 60 or data layer 45/50, an adhesive layer 35, an adhesion promotion layer 15, and an L1 dummy substrate 20, in that order. When the base substrate 40 is a prerecorded stamped L0, then a separate recordable data layer 45/50 may not be present. Rather, a metallization/metal layer 60 supported on the stamped L0 may provide reflectivity and/or other properties including adhesion promotion. Any number of intervening layers may be placed between any two layers of the media 7. In an alternative expression of the relationship of the various layers, a metallization/metal layer 60 may be supported directly on an interior side or face of the L0 base substrate 40. Alternatively, one or more data layers 45, 50 may be supported on the interior side or face of the L0 either directly or indirectly. In either case, an adhesive layer 35 is provided at a distance from the interior side of the L0 greater than the metallization/metal layer 60 or the data layer (s) 45/50. An adhesion promotion layer 15 is provided at a distance from the interior side of the L0 base substrate 40 greater than the adhesive layer 35 and facilitates secure bonding of the adhesive layer 35 to the L1 dummy substrate 20. The L1 dummy substrate 20 is provided at a distance from the interior side of the L0 base substrate 40 greater than the adhesion promotion layer.

Further alternatively expressed, in one embodiment the metallization/metal layer 60, adhesive layer 35, the adhesion promotion layer 15, and the dummy substrate 20 are positioned in ascending order of distance from an interior face of the base substrate 40. It is to be understood that the metallization/metal layer 60 may function, at least in part and be considered, as an adhesion promotion layer. In a further alternative expression of another embodiment, the one or more data layer(s) 45/50, adhesive layer 35, the adhesion promotion layer 15, and the dummy substrate 20 are positioned in ascending order of distance from an interior face of the base substrate 40. It is to be understood that the data layer(s) 45/50 may function, at least in part and be considered, as adhesion promotion layer(s). Other layers may be included in the stack between any of these ordered layers without limitation. However, it is preferred that any such intervening layer(s) do not reduce or degrade the overall bonding strength or the bonding strength between any two layers in the media 7.

FIG. 5 shows a stack of metalized or metalloidized dummy substrates 20 in accordance with the embodiments of the invention. These dummy substrates or L1 substrates 20 may be manufactured and supplied to any of a variety of digital information media manufacturers or may be used to manufacture media at the manufacturing site where they are formed. In any case, these metalized or metalloidized dummy substrates generally comprise substrates that are flat and that do not have track grooves or other structure for tracking. The materials used to metalize or metalloidize the dummy substrates may be selected from among metals, metal alloys, and metalloids, and may include one or more of chromium, titanium, nickel, tungsten, silicon, and/or combinations thereof.

Methods of Preparation

In a simple form of making digital information media, embodiments may include providing at least one dummy substrate and metalizing the dummy substrate with at least one of a metal material, a metal alloy material, and a metalloid material on a side of the dummy substrate adapted to face an interior of the digital information medium.

In some embodiments, the method may include providing a base substrate and bonding the metalized dummy substrate by an adhesive to the base substrate with the metal material, the metal alloy material, or the metalloid material between the dummy substrate and the adhesive. In one embodiment, the step of providing the base substrate includes stamping a pattern of data pits into the base substrate and metalizing the base substrate. In another embodiment, the method includes supporting at least one data layer on the base substrate.

Figure 6:
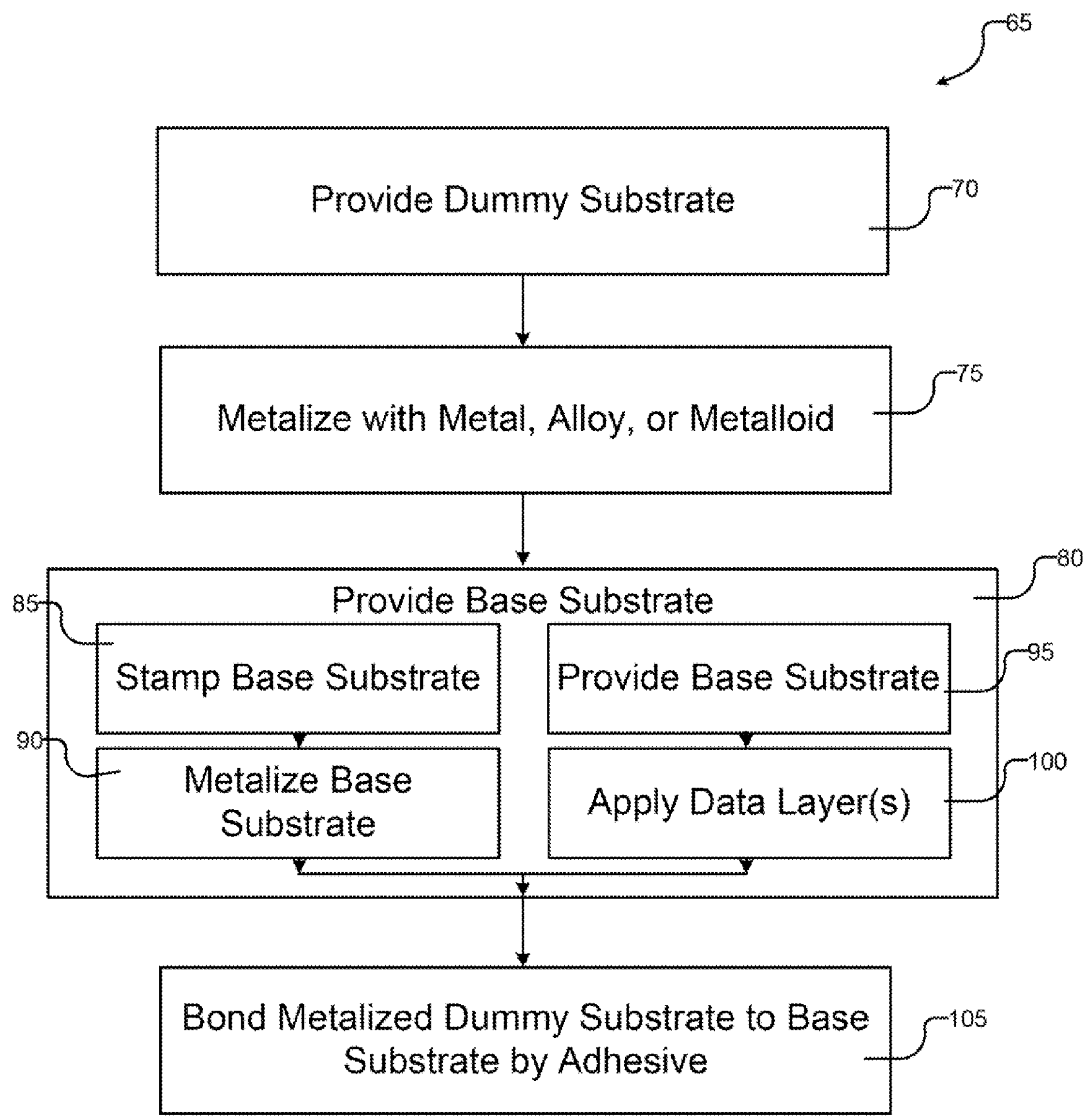
FIG. 6 shows a block diagram illustrating a method of preparing digital information media in accordance with embodiments of the invention.

FIG. 6 shows a block diagram illustrating a method 65 of preparing digital information media in accordance with embodiments of the invention. A dummy substrate or L1 may be provided, as indicated at 70. Then the dummy substrate may be metalized with at least one of a metal, a metal alloy, and a metalloid, as indicated at 75. The method 65 may also include providing a base substrate or L0, as indicated at 80. Within the step of providing the base substrate 80 there are the possible alternatives for providing a prerecorded or stamped L0, or a recordable L0 that is configured to have recordable data layers applied thereto. Thus providing the L0 may include stamping an L0 85 with prerecorded data and metalizing the L0, as indicated at 90. Alternatively, providing the L0 may include providing the L0 substrate in the form of a substrate having a wobble groove or other tracking structure and applying a data layer, as indicated at 95 and 100 in FIG. 6. Once both of the L1 and the L0 have been provided, the method may include bonding the metalized L1 to the L0 by an adhesive, as indicated at 105. The L0 may also be metalized as described herein.

In any case, the step(s) of metalizing may include applying a layer of least one material from the group comprising chromium, titanium, nickel, tungsten, silicon, and combinations thereof to the L1 and/or L0.

Methods of Use

In a simple form, a method for using a digital information medium in accordance with embodiments of the present invention may include at least one of writing digital data to the medium and reading data from the medium in a system similar to the system 5 shown in FIG. 1. Writing and/or reading is performed on a medium 7 that includes at least one first substrate that is a dummy substrate and at least one second substrate, and wherein at least one first adhesion promotion layer is supported on the first substrate. Writing and/or reading is also performed on a medium in which an adhesive bonds the second substrate to the first adhesion promotion layer such that the medium is strengthened by the first adhesion promotion layer. In another embodiment, the medium includes at least one second adhesion promotion layer supported on the second substrate. The adhesive bonds the first substrate to the second adhesion promotion layer such that the medium is strengthened by the second adhesion promotion layer as well as the first adhesion promotion layer, in certain embodiments, the adhesion promotion layer(s) include at least one of a metal, alloy, and metalloid from the group comprising chromium, titanium, nickel, tungsten, silicon, and combinations thereof.

The following examples are included to demonstrate preferred embodiments of the invention. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Prerecorded Media Having an Adhesion Promotion Layer on the Dummy Substrate

A prerecorded base substrate was prepared for bonding by stamping a predetermined pattern of pits and lands representing digital information into a polycarbonate substrate. The stamped substrate was metalized by applying a coating of silver to cover the pattern of pits and lands. A blank or dummy substrate of polycarbonate was metalized with a coating of chromium metal by sputtering the chromium on an inside of the dummy substrate to form an adhesion promotion layer. The metalized dummy substrate was bonded to the metalized, stamped, polycarbonate substrate by an acrylate bonding adhesive. The result was a prerecorded digital information medium that is expected to have improved strength against delamination or entry of degrading elements between the dummy substrate and the adhesive, as compared to media without the adhesive promotion layer.

Example 2

Recordable Media Having an Adhesion Promotion Layer on the Dummy Substrate

A base substrate having a wobble groove was prepared for bonding by applying one or more layers, including at least one data layer, on a polycarbonate base substrate. A blank or dummy substrate of polycarbonate was metalized with a coating of chromium metal by sputtering the chromium on an inside of the dummy substrate to form an adhesion promotion layer. The metalized dummy substrate was bonded to the polycarbonate base substrate and the layer(s) supported thereon by an acrylate bonding adhesive. The result was a recordable digital information medium that is expected to have improved strength against delamination or entry of degrading elements between the dummy substrate and the adhesive, as compared to recordable media without the adhesion promotion layer.

All of the compositions and/or methods and/or processes and/or apparatus disclosed and claimed herein can be made and executed without undue experimentation in light of the present disclosure. While the compositions and methods herein have been described in terms of preferred embodiments, it will be apparent to those of skill in the art that variations may be applied to the compositions and/or methods and/or apparatus and/or processes and in the steps or in the sequence of steps of the methods described herein without departing from the concept and scope of the invention. More specifically, it will be apparent that certain agents which are both chemically and physically related may be substituted for the agents described herein while the same or similar results would be achieved. All such similar substitutes and modifications apparent to those skilled in the art are deemed to be within the scope and concept of the invention.

What is claimed is:

1. Digital information media, comprising:

a base substrate supporting a data layer;

a dummy substrate ;

an adhesion promotion layer supported on the dummy substrate, the adhesion promotion layer comprising one metal, metal alloy,or metalloid; and an adhesive layer bonding the adhesion promotion layer directly or indirectly to the dummy substrate;

wherein the adhesive layer, the adhesion promotion layer, and the dummy substrate are positioned in ascending order of distance from an interior face of the base substrate.

2. The digital information media of claim 1, wherein the adhesion promotion layer comprises at least one of material selected from the group consisting of chromium, titanium, nickel, tungsten, silicon, and combinations thereof.

3. The digital information media of claim 1, further comprising a metal layer supported on the base substrate, wherein:

the metal layer comprises at least one material selected from the group consisting of chromium, titanium, nickel, tungsten, and combinations thereof;

the adhesion promotion layer comprises at least one material selected from the group consisting of chromium, titanium, nickel, tungsten, and combinations thereof; and the metal layer, the adhesive layer, the adhesion promotion layer, and the dummy substrate are positioned in ascending order of distance from the interior face of the base substrate.

4. The digital information media of claim 1, further comprising a metal layer supported on the base substrate, wherein:

the base substrate comprises a pressed substrate having a pattern of data pits stamped into the base substrate with the metal layer overlaying the pattern of data pits;

the metal layer comprises at least one material selected from the group consisting of chromium, titanium, nickel, tungsten, and combinations thereof;

the adhesion promotion layer comprises at least one material selected from the group consisting of chromium, titanium, nickel, tungsten, and combinations thereof; and the metal layer, the adhesive layer, the adhesion promotion layer, and the dummy substrate are positioned in ascending order of distance from the interior face of the base substrate.

5. The digital information media of claim 1, further comprising at least one data layer supported on the base substrate, wherein:

the adhesive layer bonds the adhesion promotion layer to the data layer; and the data layer, the adhesive layer, the adhesion promotion layer, and the dummy substrate are positioned in ascending order of distance from the interior face of the base substrate.

6. The digital information media of claim 1, wherein:

the adhesion promotion layer comprises at least one material selected from the group consisting of chromium, titanium, nickel, tungsten, silicon, and combinations thereof; and the adhesive layer bonds the adhesion promotion layer to the data layer; and the data layer, the adhesive layer, the adhesion promotion layer, and the dummy substrate are positioned in ascending order of distance from the interior face of the base substrate.

7. The digital information media of claim 1, further comprising at least two data layers supported on the base substrate, wherein:

the adhesive layer bonds the adhesion promotion layer to one of the two data layers; and the data layers, the adhesive layer, the adhesion promotion layer, and the dummy substrate are positioned in ascending order of distance from the interior face of the base substrate.

8. The digital information media of claim 1, further comprising at least two data layers supported on the first substrate, wherein:

the adhesion promotion layer comprises at least one material selected from the group consisting of chromium, titanium, nickel, tungsten, silicon, and combinations thereof;

the adhesive layer bonds the adhesion promotion layer to one of the two data layers; and the data layers, the adhesive layer, the adhesion promotion layer, and the dummy substrate are positioned in ascending order of distance from the interior face of the base substrate.

9. A digital information media, comprising:

a base substrate;

at least one metalized dummy substrate having at least one metallization material supported on a side of the dummy substrate adapted to face inwardly relative to the media, wherein:

the metallization material provides an adhesion promotion layer on the dummy substrate; and the metallization material comprises at least one material selected from the group consisting of a metal, a metal alloy, and a metalloid.

10. The digital information media of claim 9, wherein the metallization material comprises a material selected from the group consisting of chromium, titanium, nickel, tungsten, silicon, and combinations thereof.

11. The digital information media of claim 9, further comprising:

a metal layer supported on the base substrate;

wherein:

the base substrate comprises a pressed substrate having a pattern of data pits stamped into the base substrate with the metal layer overlaying the pattern of data pits;

the metal layer comprises at least one material selected from the group consisting of a metal, a metal alloy, and a metalloid; and the metal layer, adhesive layer, the adhesion promotion layer, and the dummy substrate are positioned in ascending order of distance from an interior face of the base substrate.

12. The digital information media of claim 9, further comprising:

a metal layer supported on the base substrate;

wherein:

the base substrate comprises a pressed substrate having a pattern of data pits stamped into the base substrate with the metal layer overlaying the pattern of data pits;

the metal layer comprises a material selected from the group consisting of chromium, titanium, nickel, tungsten, and combinations thereof; and the metal layer, adhesive layer, the adhesion promotion layer, and the dummy substrate are positioned in ascending order of distance from an interior face of the base substrate.

13. The digital information media of claim 9, further comprising:

at least one data layer supported on the base substrate; and an adhesive layer supported on the data layer;

wherein:

the adhesive layer bonds the adhesion promotion layer to the data layer; and the data layer, adhesive layer, the adhesion promotion layer, and the dummy substrate are positioned in ascending order of distance from an interior face of the base substrate.

14. The digital information media of claim 9, further comprising:

at least two data layers supported on the first substrate; and an adhesive layer supported on at least one of the two data layers;

wherein:

the adhesive layer bonds the adhesion promotion layer to one of the two data layers; and the data layers, adhesive layer, the adhesion promotion layer, and the dummy substrate are positioned in ascending order of distance from an interior face of the base substrate.

15. A method for preparing a digital information medium, the method comprising:

providing a base substrate;

providing at least one dummy substrate;

metalizing the dummy substrate with a metal material, a metal alloy material, or a metalloid material on a side of the dummy substrate adapted to face an interior of the digital information medium; and bonding the metalized dummy substrate by an adhesive to the base substrate with the metal material, the metal alloy material, or the metalloid material between the dummy substrate and the adhesive.

16. The method of claim 15, wherein providing the base substrate comprises stamping a pattern of data pits into the base substrate and metalizing the base substrate.

17. The method of claim 15, further comprising:

supporting at least one data layer on the base substrate; and bonding the metalized dummy substrate by an adhesive to the data layer with the metal material, the metal alloy material, and or the metalloid material between the dummy substrate and the adhesive.

18. The method of claim 15, wherein the step of metalizing comprises applying a layer comprising at least one material selected from the group consisting of chromium, titanium, nickel, tungsten, silicon, and combinations thereof.

19. A method for using a digital information medium, the method comprising writing digital data to the medium of claim 1 and reading data from the medium of claim 1.

20. The method of claim 19, wherein the first adhesion promotion layer comprises a metal, metal alloy, or metalloid selected from the group consisting of chromium, titanium, nickel, tungsten, silicon, and combinations thereof.

* * * * *